(12) United States Patent
Shirota et al.

(10) Patent No.: US 9,447,235 B2
(45) Date of Patent: Sep. 20, 2016

(54) POLYCARBONATE MANUFACTURING METHOD AND POLYCARBONATE

(71) Applicant: ASAHI GLASS COMPANY, LIMITED, Tokyo (JP)

(72) Inventors: Naoko Shirota, Tokyo (JP); Takashi Okazoe, Tokyo (JP); Kimiaki Kashiwagi, Tokyo (JP)

(73) Assignee: ASAHI GLASS COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/883,759

(22) Filed: Oct. 15, 2015

(65) Prior Publication Data

US 2016/0032046 A1 Feb. 4, 2016

Related U.S. Application Data

(63) Continuation of application No. PCT/JP2014/060194, filed on Apr. 8, 2014.

(30) Foreign Application Priority Data

Apr. 16, 2013 (JP) ................................. 2013-085816

(51) Int. Cl.
| | |
|---|---|
| *C08G 63/02* | (2006.01) |
| *C08G 64/28* | (2006.01) |
| *C08G 64/30* | (2006.01) |
| *C08G 64/00* | (2006.01) |

(52) U.S. Cl.
CPC ............. *C08G 64/28* (2013.01); *C08G 64/307* (2013.01)

(58) Field of Classification Search
CPC .................................................... C08G 63/68
USPC ................................ 528/196, 198, 199, 202
See application file for complete search history.

(56) References Cited

U.S. PATENT DOCUMENTS

| | | | | |
|---|---|---|---|---|
| 4,349,486 A * | 9/1982 | Brunelle | ................. | C07C 68/06 558/260 |
| 4,948,871 A | 8/1990 | Fukuoka et al. | | |
| 2006/0135737 A1* | 6/2006 | Davis | ..................... | C08G 63/64 528/202 |
| 2012/0226011 A1 | 9/2012 | Nomura et al. | | |

FOREIGN PATENT DOCUMENTS

| | | |
|---|---|---|
| JP | 1-158033 | 6/1989 |
| JP | 02-155921 | 6/1990 |
| JP | 07-076619 | 3/1995 |
| JP | 2005-221975 | 8/2005 |
| WO | WO 2009/123083 | 10/2009 |
| WO | WO 2011/024732 | 3/2011 |
| WO | WO 2011/062104 | 5/2011 |
| WO | WO 2011/062121 | 5/2011 |

OTHER PUBLICATIONS

International Search Report issued Jun. 24, 2014, in PCT/JP2014/060194 filed Apr. 8, 2014.

* cited by examiner

*Primary Examiner* — Terressa Boykin
(74) *Attorney, Agent, or Firm* — Oblon, McClelland, Maier & Neustadt, L.L.P.

(57) ABSTRACT

The present invention relates to a method of producing polycarbonate containing following step (a) and step (b), (a) a step of reacting a specific fluorine-containing carbonate (Compound (1), etc.) and an aromatic dihydroxy compound in the presence of a condensation catalyst, to obtain a prepolymer, and (b) a step of heating the prepolymer at a temperature which is lower than a melting temperature of the prepolymer and performing solid phase polymerization on the prepolymer while a fluorine-containing alcohol that is produced as a by-product is discharged out of a system, to obtain a polycarbonate.

[Chem. 1]

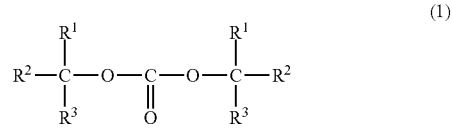

(1)

14 Claims, No Drawings

POLYCARBONATE MANUFACTURING METHOD AND POLYCARBONATE

TECHNICAL FIELD

The present invention relates to a method of producing polycarbonate and polycarbonate obtained by the production method.

BACKGROUND ART

Polycarbonates, especially, aromatic polycarbonates have been widely used in many fields as engineering plastics excellent in heat resistance, impact resistance, transparency, and the like.

As a method of producing polycarbonate, known are the following methods for example:

(i) a method of causing interfacial polycondensation of bisphenol A with phosgene in the presence of an alkali catalyst (phosgene method); and (ii) a method of causing melt-polycondensation of bisphenol A with diphenyl carbonate (ester exchange method).

In the method (i), colorless transparent polycarbonate can be obtained since the reaction proceeds at a low temperature. However, the method (i) has the following problems.

Toxic phosgene is used.

Impurities such as sodium chloride which is produced as a by-product by the reaction are not easily removed.

In the method (ii), polycarbonate is easily separated from reaction system since a solvent does not need to be used. However, the method (ii) has the following problems.

The reaction rate of an ester exchange reaction of bisphenol A and diphenyl carbonate is low and polycondensation needs to be carried out at a high temperature for a long period of time.

The boiling point of phenol to be separated by the ester exchange reaction is high and thus, the removal thereof requires a high temperature.

A side reaction or the like occurs during polycondensation due to the high temperature and polycarbonate is colored.

Phenol which is generated by the ester exchange reaction is difficult to remove because of high viscosity of a product and thus, a high molecular weight substance is unlikely to be obtained.

As a method of improving the problems of the method (i) or the method (ii), the following method (iii) is suggested (see PTLs. 1 and 2):

(iii) a method which includes a process of reacting an aromatic dihydroxy compound and diaryl carbonate to obtain a prepolymer; a process of crystallizing the prepolymer to obtain a crystallized prepolymer; and a process of heating the crystallized prepolymer in a temperature of from the glass transition temperature to lower than the melting temperature of the crystallized prepolymer and performing solid phase polymerization on the crystallized prepolymer to obtain a polycarbonate (solid phase polymerization method).

In the method (iii), phosgene does not need to be used. Further, since a polycarbonate with a high molecular weight can be produced at a low temperature as compared to the method (ii), coloration is not a problem. However, in the method (iii), a prepolymer needs to be crystallized in advance because a prepolymer which is not crystallized does not undergo the solid phase polymerization. In order to crystallize a prepolymer, it is necessary to perform any of operations of dissolving the prepolymer in a solvent and allowing it to be deposited to be crystallized; infiltrating a solvent whose dissolving power with respect to the prepolymer is weak into the prepolymer; and heating and maintaining the prepolymer in a temperature of from the glass transition temperature to lower than the melting temperature. Consequently, the method (iii) has a problem in that the process is complicated and the productivity is degraded.

CITATION LIST

Patent Document

PTL. 1: JP-A-H01-158033
PTL. 2: JP-A-H02-155921

SUMMARY OF THE INVENTION

Problem that the Invention is to Solve

The present invention provides a method of producing polycarbonate which is less likely to be colored and has a high molecular weight at a relatively low temperature with excellent productivity.

Means for Solving the Problem

The method of producing polycarbonate according to the present invention contains following step (a) and step (b):

(a) a step of reacting at least one kind of fluorine-containing carbonate selected from the group consisting of a compound represented by Formula (1), a compound represented by Formula (2), a compound represented by Formula (3), and a compound represented by Formula (4), and an aromatic dihydroxy compound in the presence of a condensation catalyst, to obtain a prepolymer; and (b) a step of heating the prepolymer at a temperature which is lower than a melting temperature of the prepolymer and performing solid phase polymerization on the prepolymer while a fluorine-containing alcohol that is produced as a by-product is discharged out of a system, to obtain a polycarbonate.

[Chem. 1]

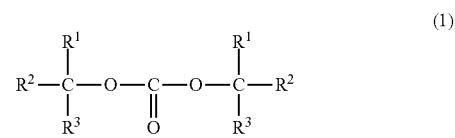

(1)

Here, $R^1$ represents a group represented by $CA^1B^1R^4$ and two $R^1$'s may be the same as or different from each other, $R^2$ represents a group represented by $CA^2B^2R^5$ and two $R^2$'s may be the same as or different from each other, $R^3$ represents a hydrogen atom or a group represented by $CA^3B^3R^6$ and two $R^3$'s may be the same as or different from each other, $A^1$ to $A^3$ each represents a hydrogen atom, a fluorine atom, or $R^f$, $B^1$ to $B^3$ each represents a hydrogen atom, a fluorine atom, or $R^f$, $R^4$ to $R^6$ represent a fluorine atom, $R^f$, or $OR^f$, and $R^f$ represents a fluoroalkyl group (which may contain an ethereal oxygen) having 1 to 12 carbon atoms or a fluoroaryl group (which may contain an ethereal oxygen) having 6 to 10 carbon atoms;

[Chem. 2]

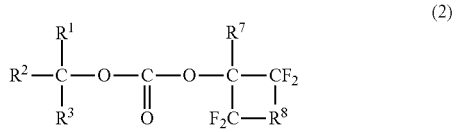

(2)

Here, $R^1$ represents a group represented by $CA^1B^1R^4$, $R^2$ represents a group represented by $CA^2B^2R^5$, $R^3$ represents a hydrogen atom or a group represented by $CA^3B^3R^6$, $R^7$ represents a hydrogen atom, $R^8$ represents a perfluoroalkylene group (which may contain an ethereal oxygen) having 1 to 5 carbon atoms, $A^1$ to $A^3$ each represents a hydrogen atom, a fluorine atom, or $R^f$, $B^1$ to $B^3$ each represents a hydrogen atom, a fluorine atom, or $R^f$, $R^4$ to $R^6$ represent a fluorine atom, $R^f$, or $OR^f$, and $R^f$ represents a fluoroalkyl group (which may contain an ethereal oxygen) having 1 to 12 carbon atoms or a fluoroaryl group (which may contain an ethereal oxygen) having 6 to 10 carbon atoms.

[Chem. 3]

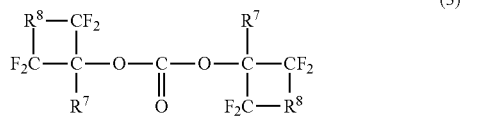

(3)

Here, $R^7$ represents a hydrogen atom, and $R^8$ represents a perfluoroalkylene group (which may contain an ethereal oxygen) having 1 to 5 carbon atoms and two $R^8$'s may be the same as or different from each other.

[Chem. 4]

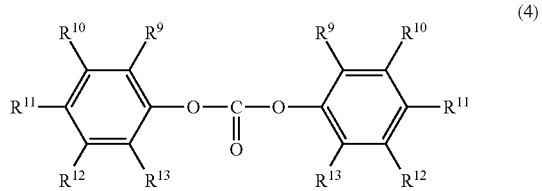

(4)

Here, $R^9$ to $R^{13}$ each represents a hydrogen atom, a fluorine atom, or a fluoroalkyl group (which may contain an ethereal oxygen) having 1 to 6 carbon atoms, two $R^9$'s, two $R^{10}$'s, two $R^{11}$'s, two $R^{12}$'s, and two $R^{13}$'s may be respectively the same as or different from each other, and the molecule includes at least one fluorine atom.

The molar ratio (fluorine-containing carbonate/aromatic dihydroxy compound) of the fluorine-containing carbonate to the aromatic dihydroxy compound in the step (a) is preferably from 1/1 to 2/1.

The prepolymer obtained in the step (a) has a mass average molecular weight of preferably from 1,000 to 10,000.

The prepolymer obtained in the step (a) has a glass transition temperature of preferably from 60° C. to 120° C.

The prepolymer in the step (b) is preferably in a powder state. The condensation catalyst in the step (a) is preferably a basic ester exchange catalyst.

The heating temperature in the step (b) is preferably 60° C. or higher.

The fluorine-containing alcohol that is produced as a by-product is preferably discharged out of the system in the step (b) at a reduced pressure of 13 kPa (absolute pressure) or less.

The fluorine-containing carbonate is preferably at least one selected from the group consisting of bis(1,1,1,3,3,3-hexafluoroisopropyl)carbonate, bis(perfluoro(t-butyl))carbonate, and bis(2,2,3,3,4,4,5,5,6,6-decafluorocyclohexyl)carbonate.

The aromatic dihydroxy compound is preferably 2,2-bis(4-hydroxyphenyl)propane.

The fluorine-containing carbonate is preferably obtained by a reaction using at least one fluorine-containing alcohol selected from the group consisting of a compound represented by Formula (5) and a compound represented by Formula (6), as a starting material.

[Chem. 5]

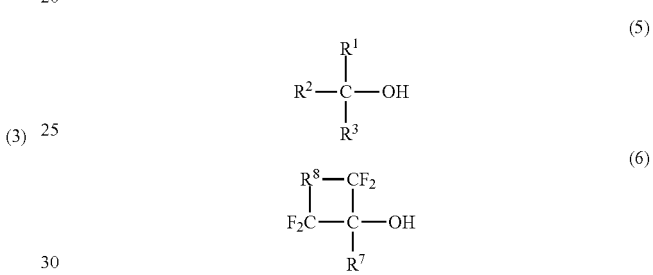

Here, $R^1$ represents a group represented by $CA^1B^1R^4$, $R^2$ represents a group represented by $CA^2B^2R^5$, $R^3$ represents a hydrogen atom or a group represented by $CA^3B^3R^6$, $R^7$ represents a hydrogen atom, $R^8$ represents a perfluoroalkylene group (which may contain an ethereal oxygen) having 1 to 5 carbon atoms, $A^1$ to $A^3$ each represents a hydrogen atom, a fluorine atom, or $R^f$, $B^1$ to $B^3$ each represents a hydrogen atom, a fluorine atom, or $R^f$, $R^4$ to $R^6$ each represents a fluorine atom, $R^f$, or $OR^f$, and $R^f$ represents a fluoroalkyl group (which may contain an ethereal oxygen) having 1 to 12 carbon atoms or a fluoroaryl group (which may contain an ethereal oxygen) having 6 to 10 carbon atoms.

The fluorine-containing alcohol has a pKa of preferably 12 or less.

The fluorine-containing alcohol is preferably at least one selected from the group consisting of 1,1,1,3,3,3-hexafluoroisopropanol, perfluoro(t-butyl)alcohol, and 2,2,3,3,4,4,5,5,6,6-decafluorocyclohexanol The polycarbonate according to the present invention is one obtained by the production method according to the present invention, and has a mass average molecular weight of from 20,000 to 200,000.

Advantageous Effect of the Invention

According to the method of producing polycarbonate of the present invention, it is possible to produce a polycarbonate which is less likely to be colored and has a high molecular weight at a relatively low temperature with excellent productivity.

The method of producing polycarbonate of the present invention is a solid phase polymerization method in which a prepolymer does not need to be crystallized in advance, and has significantly excellent productivity.

Polycarbonate of the present invention has a high molecular weight and is less likely to be colored.

MODE FOR CARRYING OUT THE INVENTION

In the present specification, a compound represented by Formula (1) is noted as a compound (1). A compound represented by another formula is noted in the same manner.

The definitions of the terms below are applied to the present specification and the scope of claims. A "prepolymer" indicates a solid intermediate product in which a condensation reaction between a fluorine-containing carbonate and an aromatic dihydroxy compound which are raw materials is stopped at appropriate timing and also indicates a polycarbonate having a mass average molecular weight lower than that of polycarbonate having a high molecular weight which is obtained by a solid phase polymerization method.

The "solid phase polymerization method" indicates a polymerization method of polymerizing a prepolymer to obtain polycarbonate having a high molecular weight while maintaining the solid state of the prepolymer.

The "melting temperature of a prepolymer" indicates the temperature at which the prepolymer is melt, enters a liquid state, or becomes softened. The prepolymer is heated at a predetermined temperature and the temperature at which it enters a liquid state or becomes softened is determined through visual confirmation.

The "glass transition temperature" indicates the temperature measured by differential scanning calorimetry (DSC) as a midpoint glass transition temperature in accordance with JIS K 7121:1987.

The "crystallization" indicates carrying out an operation for increasing crystallinity of a polymer.

A "perfluoroalkylene group" indicates a group in which all hydrogen atoms of an alkylene group are substituted with fluorine atoms.

A "fluoroalkyl group" indicates a group in which a part or all of hydrogen atoms of an alkyl group are substituted with fluorine atoms.

<Method of Producing Polycarbonate>

The method of producing polycarbonate of the present invention includes a step (a) and a step (b) as follows:

(a) a step of reacting a specific fluorine-containing carbonate and an aromatic dihydroxy compound in the presence of a condensation catalyst, to obtain a prepolymer, and (b) a step of performing solid phase polymerization on the prepolymer to obtain polycarbonate.

(Fluorine-containing Carbonate)

The fluorine-containing carbonate is at least one selected from a compound (1), a compound (2), a compound (3), and a compound (4).

[Chem. 6]

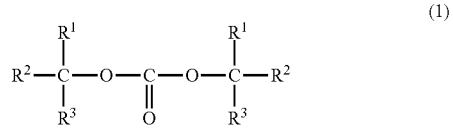

(1)

Here, $R^1$ represents a group represented by $CA^1B^1R^4$ and two $R^1$'s may be the same as or different from each other, $R^2$ represents a group represented by $CA^2B^2R^5$ and two $R^2$'s may be the same as or different from each other, $R^3$ represents a hydrogen atom or a group represented by $CA^3B^3R^6$ and two $R^3$'s may be the same as or different from each other, $A^1$ to $A^3$ each represents a hydrogen atom, a fluorine atom, or $R^f$, $B^1$ to $B^3$ each represents a hydrogen atom, a fluorine atom, or $R^f$, $R^4$ to $R^6$ represent a fluorine atom, $R^f$, or $OR^f$, and $R^f$ represents a fluoroalkyl group (which may contain an ethereal oxygen) having 1 to 12 carbon atoms or a fluoroaryl group (which may contain an ethereal oxygen) having 6 to 10 carbon atoms.

[Chem. 7]

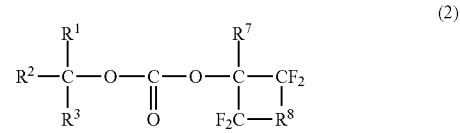

(2)

Here, $R^1$ represents a group represented by $CA^1B^1R^4$, $R^2$ represents a group represented by $CA^2B^2R^5$, $R^3$ represents a hydrogen atom or a group represented by $CA^3B^3R^6$, $R^7$ represents a hydrogen atom, $R^8$ represents a perfluoroalkylene group (which may contain an ethereal oxygen) having 1 to 5 carbon atoms, $A^1$ to $A^3$ each represents a hydrogen atom, a fluorine atom, or $R^f$, $B^1$ to $B^3$ each represents a hydrogen atom, a fluorine atom, or $R^f$, $R^4$ to $R^6$ represent a fluorine atom, $R^f$, or $OR^f$, and $R^f$ represents a fluoroalkyl group (which may contain an ethereal oxygen) having 1 to 12 carbon atoms or a fluoroaryl group (which may contain an ethereal oxygen) having 6 to 10 carbon atoms.

[Chem. 8]

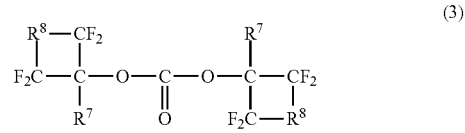

(3)

Here, $R^7$ represents a hydrogen atom and $R^8$ represents a perfluoroalkylene group (which may contain an ethereal oxygen) having 1 to 5 carbon atoms and two $R^8$'s may be the same as or different from each other.

[Chem. 9]

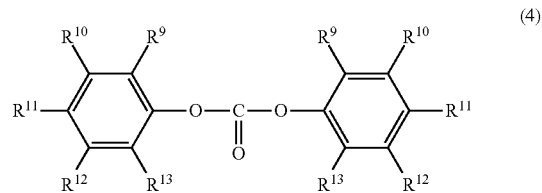

(4)

Here, $R^9$ to $R^{13}$ each represents a hydrogen atom, a fluorine atom, or a fluoroalkyl group (which may contain an ethereal oxygen) having 1 to 6 carbon atoms, two $R^9$'s, two $R^{10}$'s, two $R^{11}$'s, two $R^{12}$'s, and two $R^{13}$'s may be respectively the same as or different from each other, and the molecule includes at least one fluorine atom.

Specific examples of the fluorine-containing carbonate include the followings:

bis(1,1,1,3,3,3-hexafluoroisopropyl)carbonate, $((CF_3CF_2)(CF_3)CHO)_2CO$, ((CF$_3$CF$_2$)$_2$CHO)$_2$CO,
bis(perfluoro(t-butyl))carbonate,
bis(2,2,3,3,4,4,5,5-octafluorocyclopentyl)carbonate,
bis(2,2,3,3,4,4,5,5,6,6-decafluorocyclohexyl)carbonate,
bis(perfluorophenyl)carbonate,
bis(m-trifluoromethylphenyl)carbonate,
bis(o-trifluoromethylphenyl)carbonate,
bis(p-trifluoromethylphenyl)carbonate, and the like.

In terms of ester exchange reaction rate, as the fluorine-containing carbonate, preferred are the followings:
bis(1,1,1,3,3,3-hexafluoroisopropyl)carbonate,
bis(perfluoro(t-butyl))carbonate, and
bis(2,2,3,3,4,4,5,5,6,6-decafluorocyclohexyl)carbonate.

In terms of availability of raw materials, ease of producing the fluorine-containing carbonate, and capability of producing polycarbonate with a high molecular weight, bis(1,1,1,3,3,3-hexafluoroisopropyl)carbonate is particularly preferable as the fluorine-containing carbonate.

A fluorine-containing carbonate which is obtained by a reaction using a fluorine-containing alcohol as a starting material is preferable.

As the fluorine-containing alcohol, preferred is at least one selected from the group consisting of a compound (5) and a compound (6).

[Chem. 10]

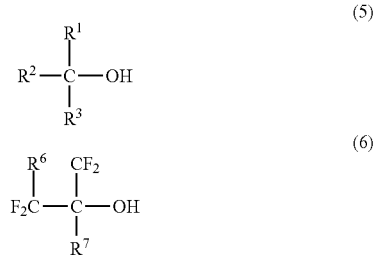

Here, $R^1$ represents a group represented by $CA^1B^1R^4$, $R^2$ represents a group represented by $CA^2B^2R^5$, $R^3$ represents a hydrogen atom or a group represented by $CA^3B^3R^6$, $R^7$ represents a hydrogen atom, $R^8$ represents a perfluoroalkylene group (which may contain an ethereal oxygen) having 1 to 5 carbon atoms, $A^1$ to $A^3$ each represents a hydrogen atom, a fluorine atom, or $R^f$, $B^1$ to $B^3$ each represents a hydrogen atom, a fluorine atom, or $R^f$, $R^4$ to $R^6$ represent a fluorine atom, $R^f$, or $OR^f$, $R^f$ represents a fluoroalkyl group (which may contain an ethereal oxygen) having 1 to 12 carbon atoms or a fluoroaryl group (which may contain an ethereal oxygen) having 6 to 10 carbon atoms.

In terms of improving ester exchange reaction rate, a fluorine-containing alcohol having an acid dissociation degree higher than the acid dissociation degree of an aromatic dihydroxy compound is preferable. Accordingly, a secondary or tertiary fluorine-containing alcohol in which a fluoroalkyl group is directly bonded to a carbon atom (hereinafter, referred to as an a carbon) at an α-position of a hydroxyl group is preferable. In this case, an alcohol in which a fluorine atom is directly bonded to the a carbon is not preferable because a decomposition reaction easily occurs due to a dehydrofluorination reaction.

As the compound (5), a fluorine-containing alcohol where $R_3$ is a group represented by $CA^3B^3R^6$, that is, a tertiary one is preferable in terms that the acid dissociation degree of fluorine-containing alcohol is increased as the number of fluoroalkyl groups bonded to the a-carbon becomes greater.

In terms of stability of fluorine-containing carbonate, a fluorine-containing alcohol where $R^3$ is a group represented by a hydrogen atom, that is, a secondary one is preferable.

As a measure of the acid dissociation degree, a pKa of the fluorine-containing alcohol can be used.

In terms of improving ester exchange reaction rate, the pKa of the fluorine-containing alcohol is preferably 12 or less, more preferably 11 or less, and particularly preferably 10 or less. In terms of availability of raw materials and ease of producing fluorine-containing carbonate, the pKa of the fluorine-containing alcohol is preferably 5 or greater.

The number of carbon atoms of the fluorine-containing alcohol is preferably from 2 to 10. When the number of carbon atoms of the fluorine-containing alcohol is 2 or greater, stable fluorine-containing alcohol in which a fluorine atoms is not directly bonded to an α-position of a hydroxyl group can be selected. When the number of carbon atoms of the fluorine-containing alcohol is 10 or less, polycarbonate with high quality can be produced without applying a high temperature during the ester exchange reaction because when the fluorine-containing alcohol which is dissociating at the time of the ester exchange reaction is distilled away, it has a boiling point which makes the removal easy under mild conditions.

Specific examples of the fluorine-containing alcohol include the followings:
1,1,1,3,3,3-hexafluoroisopropanol (pKa: 9.4),
(CF$_3$CF$_2$)(CF$_3$)CHOH (pKa: 9.5),
(CF$_3$CF$_2$)$_2$CHOH (pKa: 10.6),
perfluoro(t-butyl)alcohol (pKa: 5.3),
2,2,3,3,4,4,5,5-octafluorocyclopentanol,
2,2,3,3,4,4,5,5,6,6-decafluorocyclohexanol, and the like.

In terms of the acid dissociation degree, as the fluorine-containing alcohol, preferred are the followings:
1,1,1,3,3,3-hexafluoroisopropanol,
perfluoro(t-butyl)alcohol, and 2,2,3,3,4,4,5,5,6,6-decafluorocyclohexanol.

In terms of availability and ease of producing a fluorine-containing carbonate, 1,1,1,3,3,3-hexafluoroisopropanol is particularly preferable as the fluorine-containing alcohol.

As a method of producing a fluorine-containing carbonate, there may be a method of reacting a fluorine-containing alcohol, a phosgene, a dialkyl carbonate, a compound (7), and the like.

[Chem. 11]

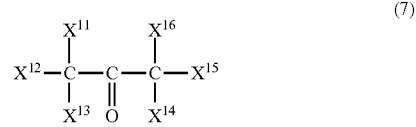

Here, $X^{11}$ to $X^{13}$ each represents a hydrogen atom or a halogen atom and at least one of $X^{11}$ to $X^{13}$ represents a halogen atom, and $X^{14}$ to $X^{16}$ each represents a hydrogen atom or a halogen atom and at least one of $X^{14}$ to $X^{16}$ represents a halogen atom. It is preferable that all of $X^{11}$ to $X^{16}$ represent a hydrogen atom, more preferably represent a fluorine atom or a chlorine atom, and particularly preferably represent a chlorine atom in terms of obtaining chloroform as a by-product.

As a specific method of obtaining a fluorine-containing carbonate by using a secondary fluorine-containing alcohol having a high acid dissociation degree as a starting material, a reaction with phosgenes is preferable in terms of the yield and a reaction with triphosgene is more preferable in terms of ease of handling.

A fluorine-containing alcohol and a triphosgene can be reacted with each other in a solvent in the presence of a base catalyst. As the solvent, toluene is preferable in terms of ease of purification. As the base catalyst, preferred is at least one selected from the group consisting of tertiary amines, alkali metal hydrides, alkaline earth metal hydrides, alkali metals, and alkaline earth metals. The reaction temperature thereof is preferably from −50° C. to 60° C.

(Aromatic dihydroxy compound)

As the aromatic dihydroxy compound, preferred is an aromatic compound having two phenolic hydroxyl groups.

Specific examples of the aromatic dihydroxy compound include the followings:

2,2-bis(4-hydroxyphenyl)propane (hereinafter, also referred to as bisphenol A), 2,2-bis(4-hydroxyphenyl)-1,1,1,3,3,3-hexafluoropropane (hereinafter, also referred to as bisphenol AF), hydroquinone, 4,4'-dihydroxybiphenyl, 9,9-bis(4-hydroxyphenyl)fluorene, bis(4-hydroxyphenyl)ether, bis(4-hydroxyphenyl)thioether, bis(4-hydroxyphenyl)sulfone, bis(4-hydroxyphenyl)ketone, and the like.

In terms of availability of raw materials or usefulness of polycarbonate, as the aromatic dihydroxy compound, bisphenol A or bisphenol AF is preferable and bisphenol A is particularly preferable.

(Condensation Catalyst)

As the condensation catalyst, basic ester exchange catalysts are exemplified.

Examples of the basic ester exchange catalyst include nitrogen-containing compounds, alkali metal compounds, alkaline earth metal compounds, and the like.

Examples of the nitrogen-containing compound include amines, quaternary ammonium hydroxide, salts of amines, and the like.

Examples of the alkali metal compound or the alkaline earth metal compound include organic acid salts, inorganic salts, oxides, hydroxides, hydrides, alkoxides and the like of alkali metal or alkaline earth metal.

The condensation catalyst may be used one kind alone or used in combination of two or more kinds thereof.

In terms of high polymerization activity and excellent applicability to solution polymerization that produces a prepolymer, amines are preferable as the condensation catalyst.

Specific examples of the nitrogen-containing compound include tertiary amines (triethylamine, tripropylamine, tributylamine, triisoamylamine, trihexylamine, triheptylamine, trioctylamine, tridodecylamine, etc.), secondary amines (diethylamine, dibutylamine, etc.), primary amines (propylamine, butylamine, etc.), imidazoles (2-methylimidazole, 2-phenylimidazole, benzoimidazole, etc.), quaternary ammonium hydroxides including alkyl group and/or an aryl group (tetramethyl ammonium hydroxide, tetraethyl ammonium hydroxide, tetrapropyl ammonium hydroxide, tetrabutyl ammonium hydroxide, trimethylbenzylammonium hydroxide, etc.), and the like Specific examples of the alkali metal compound include sodium hydroxide, potassium hydroxide, cesium hydroxide, lithium hydroxide, sodium hydrogen carbonate sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium phenylated boron, sodium benzoate, potassium benzoate, cesium benzoate, lithium benzoate, disodium hydrogen phosphate, dipotassium hydrogen phosphate, disodium phenyl phosphate, sodium gluconate, and disodium salts, dipotassium salts, dicesium salts, and dilithium salts of bisphenol A, and sodium salts, potassium salts, cesium salts, and lithium salts of phenol, and the like.

Specific examples of the alkaline earth metal compound include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, and the like.

(Step (a))

A fluorine-containing carbonate and an aromatic dihydroxy compound are reacted with each other in the presence of a condensation catalyst, to obtain a prepolymer.

Specifically, for example, a fluorine-containing carbonate and an aromatic dihydroxy compound are reacted in a solvent in the presence of a condensation catalyst and then the solvent and a fluorine-containing alcohol which is produced as a by-product are distilled away, thereby obtaining a solid prepolymer. It is preferable that the prepolymer is dried at a temperature lower than the glass transition temperature of the prepolymer.

The molar ratio of the fluorine-containing carbonate to the aromatic dihydroxy compound (fluorine-containing carbonate/aromatic dihydroxy compound) in the step (a) is preferably from 1/1 to 2/1, more preferably from 1/1 to 1.3/1, and particularly preferably from 1.02/1 to 1.2/1. When the molar ratio of the fluorine-containing carbonate to the aromatic dihydroxy compound is in the above-described range, a prepolymer having a constituent unit derived from the fluorine-containing carbonate at the terminal thereof is easily obtained. In the prepolymer having a constituent unit derived from the fluorine-containing carbonate at the terminal thereof, solid phase polymerization easily proceeds without crystallizing the prepolymer as described below. Moreover, the solid phase polymerization proceeds even at a temperature lower than the glass transition temperature of the prepolymer.

The mass average molecular weight of the prepolymer is preferably from 1,000 to 10,000, more preferably from 1,000 to 7,000, and particularly preferably from 1,000 to 5,000. When the mass average molecular weight of the prepolymer is in the above-described range, the prepolymer is in a powder state and solid phase polymerization in the step (b) easily proceeds.

The glass transition temperature of the prepolymer is preferably from 60° C. to 120° C., more preferably from 70° C. to 120° C., and particularly preferably from 80° C. to 120° C. When the glass transition temperature of the prepolymer is in the above-described range, solid phase polymerization in the step (b) easily proceeds at a low temperature without melting the prepolymer.

The molar ratio of a fluorine-containing alkoxy terminal group, which is derived from a fluorine-containing carbonate and is sealed, to a hydroxyl group terminal group derived from an aromatic dihydroxy compound (fluorine-containing alkoxy terminal group/hydroxyl group) of the prepolymer obtained in the step (a) is preferably 0.8/1 to 1.4/1, more preferably from 0.9/1 to 1.3/1, and particularly preferably from 0.95/1 to 1.25/1. When the content of the fluorine-containing alkoxy terminal group is less than the above-described range, the concentration of the hydroxyl group of the polycarbonate terminal obtained in the solid phase polymerization during the step (b) is increased, which is not preferable. Meanwhile, when the content of the fluorine-containing alkoxy terminal group exceeds the above-described range, a polycarbonate resin having a sufficiently high molecular weight cannot be obtained in some cases.

In the present specification, it is preferable that the molar ratio in a terminal group of polymers (including a prepolymer and a polycarbonate resin having a high molecular weight) is analyzed by 1H-NMR analysis of the polymer. The specific 1H-NMR analysis method will be described in Examples below.

It is preferable that a prepolymer is in a powder state. When the prepolymer is in a powder state, solid phase polymerization in the step (b) easily proceeds.

The prepolymer obtained in the step (a) is obtained in a state of a solution because a solvent is normally used at the time of production. Accordingly, the solvent and a fluorine-containing alcohol which is produced as a by-product are distilled away and then the solid prepolymer is isolated. It is preferable that the remaining solvent or the like is removed by drying the prepolymer in a vacuum at a low temperature. The obtained solid prepolymer can be allowed to be a powder state by using various methods. For example, a method of mechanically pulverizing or a method of mechanically pulverizing in a frozen state is preferable.

The average particle diameter of the prepolymer in a powder state is preferably from 0.1 μm to 1 mm. When the average particle diameter is in the above-described range, the prepolymer in a powder state can be easily obtained by performing a simple operation. Further, the solid phase polymerization in the step (b) easily proceeds.

The average particle diameter of the prepolymer is more preferably from 1 μm to 500 μm and particularly preferably from 3 μm to 200 μm.

(Step (b))

The prepolymer is heated at a temperature lower than the melting temperature of the prepolymer without carrying out a step of crystallizing the prepolymer, and solid phase polymerization is performed on the prepolymer while a fluorine-containing alcohol that is produced as a by-product is discharged out of a system, to thereby obtain polycarbonate.

The heating temperature is lower than the melting temperature of the prepolymer, and is preferably from 60° C. to lower than the melting temperature of the prepolymer, more preferably from 70° C. to 240° C., still more preferably from 90° C. to 200° C., and particularly preferably from 90° C. to 180° C. Specifically, it is preferable that the heating is started at a temperature of around 70° C., the temperature is gradually increased, and the temperature is finally set to be from 180° C. to 200° C. When the heating temperature is in the above-described range, the solid phase polymerization easily proceeds and polycarbonate without coloration or branches due to a side reaction such as Fries rearrangement can be obtained. Further, productivity of the polycarbonate is high.

The heating time period is preferably from 5 hours to 20 hours, more preferably from 5 hours to 15 hours, and particularly preferably from 7 hours to 12 hours. When the heating time period is in the above-described range, the productivity of the polycarbonate is high and it is suitable for industrial production.

Examples of a method of discharging a fluorine-containing alcohol produced as a by-product at the time of solid phase polymerization out of the system include a method of performing solid phase polymerization under a reduced pressure, a method of performing solid phase polymerization while blowing an inert gas, a method of combining them, and the like. Since the method of introducing an inert gas requires recycling of the inert gas discharged out of the system and thus the process becomes complicated, the method of performing solid phase polymerization under a reduced pressure is more preferable.

The pressure at which the prepolymer is subjected to solid phase polymerization under a reduced pressure is preferably a high vacuum area of 13 kPa (absolute pressure) (100 torr (absolute pressure)) or less, more preferably 1.3 kPa (absolute pressure) (10 ton (absolute pressure)) or less, and particularly preferably from 0.67 kPa to 0.013 kPa (absolute pressure) (5 ton to 0.1 torr (absolute pressure)). When the pressure is in the above-described range, solid phase polymerization rapidly proceeds.

The inert gas indicates an inert gas for solid phase polymerization and examples thereof include nitrogen, argon, helium, carbon dioxide, lower hydrocarbon, acetone, and the like.

As an apparatus for solid phase polymerization, a known apparatus is exemplified. The type of apparatus may be any of a batch type, a continuous type, a type of combining them or the like. Specific examples thereof include a tumbler type, a kiln type, a paddle dryer type, a screw conveyor type, a vibration type, a fluidized bed type, a fixed bed type, a moving bed type, and the like. As an apparatus for experiment, a vacuum drier or the like which is used for drying a polymer can be used.

(Effects)

The method of producing polycarbonate of the present invention described above includes (a) a step of reacting a specific fluorine-containing carbonate and an aromatic dihydroxy compound in the presence of a condensation catalyst to obtain a prepolymer and (b) a step of performing solid phase polymerization on the prepolymer to obtain a polycarbonate. Thus, the polycarbonate which is less likely to be colored and has a high molecular weight can be produced at a relatively low temperature with high productivity.

That is, in the production method of the present invention, since a specific fluorine-containing carbonate and an aromatic dihydroxy compound are reacted, a prepolymer having a constituent unit derived from the fluorine-containing carbonate at the terminal thereof is obtained. In the prepolymer having a constituent unit derived from the fluorine-containing carbonate at the terminal thereof, it is considered that solid phase polymerization proceeds without crystallizing the prepolymer because the constituent unit derived from the fluorine-containing carbonate at the terminal has high affinity for other polymers and the ester exchange reaction easily occurs. Further, the solid phase polymerization proceeds even at a relatively low temperature (e.g., even at a temperature lower than the glass transition temperature of the prepolymer). Thus, a polycarbonate which is less likely to be colored and has a high molecular weight can be produced at a relatively low temperature with excellent productivity without using toxic compounds such as a phosgene.

Meanwhile, in a case of a prepolymer obtained by reacting a diaryl carbonate or a dialkyl carbonate other than the specific fluorine-containing carbonate and an aromatic dihydroxy compound, it is considered that solid phase polymerization does not proceed unless the orientation of molecules of the prepolymer is aligned by crystallization because a constituent unit derived from the diaryl carbonate or the dialkyl carbonate at the terminal has low affinity for other prepolymers and the ester exchange reaction is unlikely to occur.

EXAMPLES

The present invention will be described in detail with reference to Examples, but the present application is not limited thereto.

The examples 1 to 4 are Examples and the examples 5 to 8 are Comparative Examples.

The mass average molecular weight, the glass transition temperature, and the melting temperature of a polycarbonate or a prepolymer were measured by using the following methods.

(Mass Average Molecular Weight)

A calibration curve was prepared by performing GPC measurement on several kinds of standard polystyrenes having a known molecular weight by using a GPC measuring device (HLC-8220, manufactured by TOSOH CORPORATION) and chloroform as a developing solvent. The mass average molecular weight in terms of polystyrene was calculated from the retention time of the GPC measurement of samples based on the calibration curve.

(Glass Transition Temperature)

The glass transition temperature was acquired by performing DSC measurement on the samples by using a differential scanning calorimeter (Q100, manufactured by TA Instruments Japan) in a nitrogen atmosphere under a condition of a temperature rising rate of 10° C/min.

(Melting Temperature)

The temperature at which a prepolymer entered a liquid state or was softened when held at a predetermined temperature was set as the melting temperature.

(Measurement of Average Particle Diameter)

Sieves having nine stages of openings of 38 μm, 75 μm, 105 μm, 250 μm, 355 μm, 500 μm, 1,000 μm, and 1,700 μm and a saucer were prepared, sieves were stacked on the saucer in an order of increasing the size of openings, and 5 g of polymer particles was added from the top of the uppermost sieve of 1,700 μm. The whole was attached to a vibration sieve machine (M-2T type, manufactured by TSUTSUI SCIENTIFIC INSTRUMENTS CO., LTD.), and the vibration was applied for approximately 1 minute while flowing a solvent (which was inactive against a polymer and hexane was used here). The particles remaining on the respective sieves and the saucer were dried in a vacuum drier at 80° C. for 2 hours and then further at 100° C. for 2 hours. The mass of the particles was measured and the mass ratios (%) of the particles on the respective sieves were calculated. The mass ratios of the particles were integrated from the saucer to the respective sieves in an order of increasing the size of openings and the particle diameter at which the sum reached 50% was set as an average particle diameter.

(Measurement of molar ratio of fluorine-containing alkoxy terminal group/hydroxyl group terminal group in prepolymer)

In 1 g of deuterium-substituted chloroform (containing TMS) was dissolved 0.03 g of a prepolymer and then the molar ratio of a fluorine-containing alkoxy terminal group, which was derived from a fluorine-containing carbonate and was sealed, to a hydroxyl group terminal group derived from an aromatic dihydroxy compound of the prepolymer was measured by using a nuclear magnetic resonance analyzer 1H-NMR.

Device: JNM-AL300 (300 Hz) manufactured by JEOL Ltd.

Measured nucleus: 1 H

Number of times of scanning: 512 times

An example in which bis(1,1,1,3,3,3-hexafluoroisopropyl) carbonate was used as carbonate is described below.

The terminal group derived from bis(1,1,1,3,3,3-hexafluoroisopropyl)carbonate was acquired from integrated intensity of proton (1 H) of a hexafluoroisopropyl group around 5.6 ppm. As for an integrated intensity of the hydroxyl group terminal group derived from an aromatic dihydroxy compound, the integrated intensity of the aromatic hydroxyl group terminal group was set from integrated intensity of proton (2 H) at a position adjacent to aromatic hydroxyl group terminal around 6.7 ppm. The molar ratio of the terminal group derived from bis(1,1,1,3,3,3-hexafluoroisopropyl)carbonate to the hydroxyl group terminal group derived from the aromatic dihydroxy compound was calculated from the acquired integrated intensity ratio.

Example 1

To a 30 mL-test tube made of silicate glass and having a lid were charged 2.28 g (0.010 mol) of bisphenol A, 4.00 g (0.011 mol) of bis(1,1,1,3,3,3-hexafluoroisopropyl)carbonate, 0.094 g (0.4 mmol) of triisoamylamine, 0.17 mg (2 μmol) of sodium hydrogen carbonate, and 10 g of methylene chloride in a nitrogen atmosphere, followed by heating at 40° C. for 2 hours and then further at 50° C. for 2 hours while stirring. As a result, a uniform and transparent solution was obtained.

The reaction solution was transferred to a 100 mL-eggplant flask and attached to an evaporator. The eggplant flask was heated in a warm water bath at 40° C., the pressure thereof was decreased from 200 mmHg to 80 mmHg, and the liquid was distilled away, thereby obtaining a white solid. The distillate contained methylene chloride and 1,1,1,3,3,3-hexafluoropropanol.

The white solid was dried in a vacuum drier (DP33 type, manufactured by YAMATO SCIENTIFIC CO., LTD.) under reduced pressure (0.133 kPa (absolute pressure)) at 70° C. for 2 hours and 90° C. for 2 hours, thereby obtaining a prepolymer. The obtained prepolymer was a white solid. The prepolymer had a mass average molecular weight of 7,979 and a melting temperature of 190° C.

The prepolymer was pulverized by using a spatula and entered a powder state. The average particle diameter of the prepolymer was 102.2 μm.

The prepolymer in a powder state was heated in the vacuum drier under reduced pressure (0.133 kPa (absolute pressure)) at 110° C. for 2 hours, 130° C. for 2 hours, 140° C. for 2 hours, and 150° C. for 2 hours. The obtained polycarbonate was in a white powder state. The mass average molecular weight of the polycarbonate was 16,383 after being heated at 110° C., 42,764 after being heated at 130° C., 76,245 after being heated at 140° C., and 95,054 after being heated at 150° C.

When the solid in a white powder state after being heated at 150° C. was heated in the vacuum drier under reduced pressure (0.133 kPa (absolute pressure)) at 240° C. for 30 minutes, translucent bulk polycarbonate was obtained. The polycarbonate had a mass average molecular weight of 130,250 and a glass transition temperature of 158.8° C.

Example 2

To a 30 mL-test tube made of silicate glass and having a lid were charged 2.28 g (0.0100 mol) of bisphenol A, 3.81 g (0.0105 mol) of bis(1,1,1,3,3,3-hexafluoroisopropyl)carbonate, 0.094 g (0.4 mmol) of triisoamylamine, 0.17 mg (2 µmol) of sodium hydrogen carbonate, and 10 g of methylene chloride in a nitrogen atmosphere, followed by heating at 40° C. for 1 hour and then further at 50° C. for 3 hours while stirring. As a result, a uniform and transparent solution was obtained.

The reaction solution was transferred to a 100 mL-eggplant flask and attached to an evaporator. The eggplant flask was heated in a warm water bath at 40° C., the pressure thereof was decreased from 200 mmHg to 80 mmHg, and the liquid was distilled away, thereby obtaining a white solid. The distillate contained methylene chloride and 1,1,1,3,3,3-hexafluoropropanol.

The flask containing the white solid was dried under reduced pressure (0.53 kPa (absolute pressure) or less) at 50° C. for 1 hour and 70° C. for 1 hour, thereby obtaining a prepolymer. The obtained prepolymer was a white solid. The prepolymer had a mass average molecular weight of 5,362 and a melting temperature of 180° C. The molar ratio of the fluorine-containing alkoxy terminal group/the hydroxyl group terminal group of the prepolymer was 1.05/1.0.

The prepolymer was pulverized by using a spatula and entered a powder state. The average particle diameter of the prepolymer was 110.3 µm.

The prepolymer in a powder state was heated in the flask under reduced pressure (approximately 0.53 kPa (absolute pressure)) at 90° C. for 2 hours, 130° C. for 2 hours, 140° C. for 2 hours, and 150° C. for 2 hours. The obtained polycarbonate was in a white powder state. The mass average molecular weight of the polycarbonate was 10,670 after being heated at 90° C., 29,595 after being heated at 110° C., 100,900 after being heated at 130° C., 142,646 after being heated at 140° C., and 185,354 after being heated at 150° C.

When the solid in a white powder state after being heated at 150° C. was heated in the flask under reduced pressure (approximately 0.53 kPa (absolute pressure)) at 180° C. for 30 minutes, white bulk polycarbonate was obtained. The polycarbonate had a mass average molecular weight of 186,441, a glass transition temperature of 162.6° C., and a melting temperature of 270° C.

Example 3

Into a 200 mL-autoclave made of SUS was charged 25.11 g (0.110 mol) of bisphenol A, followed by vacuum deaeration at a pressure of 0.53 kPa (absolute pressure) for 1 hour while stirring at 15 rpm. Subsequently, to the autoclave were charged 41.93 g (0.116 mol) of bis(1,1,1,3,3,3-hexafluoroisopropyl)carbonate, 1.18 g (4.4 mmol) of triisoamylamine, and 111.8 g of methylene chloride. After the autoclave was cooled in liquid nitrogen for 15 minutes and the contents were frozen, deaeration was performed at a pressure of 0.53 kPa (absolute pressure). Next, the autoclave was returned to room temperature. When the contents in the autoclave were heated at 50° C. for 1 hour and then at 60° C. for 1 hour while stirring, a uniform and transparent solution was obtained.

The reaction solution was transferred to a 1 L-eggplant flask and attached to an evaporator. The eggplant flask was heated in a warm water bath at 40° C., the pressure thereof was decreased from 200 mmHg to 80 mmHg, and the liquid was distilled away, thereby obtaining a white solid. The distillate contained methylene chloride and 1,1,1,3,3,3-hexafluoropropanol.

The flask containing the white solid was held under reduced pressure (0.53 kPa (absolute pressure) or less) at room temperature for 30 minutes to thereby distill the remaining solvent away, and dried at 50° C. for 1 hour and at 70° C. for 1 hour, thereby obtaining a prepolymer. The obtained prepolymer was a white solid. The prepolymer had a mass average molecular weight of 5,116 and a melting temperature of 180° C. The molar ratio of the fluorine-containing alkoxy terminal group/the hydroxyl group terminal group of the prepolymer was 1.23/1.0. The prepolymer was pulverized by using a spatula and entered a powder state. The average particle diameter of the prepolymer was 105.5 µm.

The prepolymer in a powder state was heated in the flask under reduced pressure (approximately 0.53 kPa (absolute pressure)) at 90° C. for 1 hour, 110° C. for 1 hour, 130° C. for 3 hours, 140° C. for 2 hours, 180° C. for 3 hours, and 200° C. for 2 hours. The obtained polycarbonate was in a white powder state. The mass average molecular weight of the polycarbonate was 8,112 after being heated at 90° C., 10,151 after being heated at 110° C., 42,436 after being heated at 130° C., 57,786 after being heated at 140° C., and 79,201 after being heated at 180° C.

When the solid in a white powder state after being heated at 180° C. was heated in the flask under reduced pressure (approximately 0.53 kPa (absolute pressure)) at 200° C. for 2 hours, white bulk polycarbonate was obtained. The polycarbonate had a mass average molecular weight of 90,419, a glass transition temperature of 155.8° C., and a melting temperature of 260° C.

Example 4

To a 5 mL-test tube made of silicate glass having a lid were charged 0.68 g (3.0 mmol) of bisphenol A, 1.06 g (3.03 mmol) of bis(m-trifluoromethylphenyl)carbonate, 0.032 g (0.12 mmol) of triisoamylamine, 0.05 mg (0.6 µmol) of sodium hydrogen carbonate, and 4 g of methylene chloride in a nitrogen atmosphere, followed by heating at 50° C. for 4 hours while stirring. As a result, a uniform and transparent solution was obtained.

The reaction solution was transferred to a 50 mL-eggplant flask and attached to an evaporator. The eggplant flask was heated in a warm water bath at 50° C., the pressure thereof was decreased from 200 mmHg to 80 mmHg, and the liquid was distilled away, thereby obtaining a liquid with high viscosity. The distillate contained methylene chloride.

The liquid with high viscosity is dried in a vacuum drier under reduced pressure (0.133 kPa (absolute pressure)) at 100° C. for 1 hour, 120° C. for 1 hour, and 130° C. for 2 hours, thereby obtaining a prepolymer. The obtained prepolymer was a white solid. The mass average molecular weight of the prepolymer was 2,314.

The prepolymer was pulverized by using a spatula and entered a powder state.

The prepolymer in a powder state was heated in the vacuum drier under reduced pressure (0.133 kPa (absolute pressure)) at 140° C. for 2 hours, 150° C. for 2 hours, and 180° C. for 2 hours, thereby obtaining a white solid (polycarbonate). The mass average molecular weight of the polycarbonate was 4,218 after being heated at 140° C., 9,325 after being heated at 150° C., and 15,046 after being heated at 180° C.

Example 5

To a 5 mL-test tube made of silicate glass having a lid were charged 1.826 g (8.0 mmol) of bisphenol A, 2.553 g (8.8 mmol) of bis(2,2,3,3-tetrafluoropropyl)carbonate, 0.076 g (0.32 mmol) of triisoamylamine, 0.13 mg (1.6 μmol) of sodium hydrogen carbonate, and 18.3 g of methylene chloride in a nitrogen atmosphere, followed by heating at 50° C. for 4 hours while stirring. However, unreacted bisphenol A remained in a solid state. Even though the reaction was further attempted by raising the temperature to 80° C. for 4 hours and to 90° C. for 4 hours, the bisphenol A still remained.

Example 6

To a 5 mL-test tube made of silicate glass having a lid were charged 0.683 g (3.0 mmol) of bisphenol A, 2.395 g (3.3 mmol) of $(C_6F_{13}CH_2CH_2O)_2CO$, 0.052 g (0.19 mmol) of triisoamylamine, 0.05 mg (0.6 μmol) of sodium hydrogen carbonate, and 4.0 g of methylene chloride in a nitrogen atmosphere, followed by heating at 50° C. for 4 hours while stirring. However, unreacted bisphenol A remained in a solid state. Even though the reaction was further attempted by raising the temperature to 80° C. for 4 hours and to 90° C. for 4 hours, the bisphenol A still remained.

Example 7

To a 5 mL-test tube made of silicate glass having a lid were charged 0.685 g (3.0 mmol) of bisphenol A, 1.076 g (3.3 mmol) of $(C_2F_5CH_2O)_2CO$, 0.12 mmol) of triisoamylamine, 0.05 mg (0.6 μmol) of sodium hydrogen carbonate, and 4.0 g of methylene chloride in a nitrogen atmosphere, followed by heating at 50° C. for 4 hours while stirring. However, unreacted bisphenol A remained in a solid state. Even though the reaction was further attempted by raising the temperature to 80° C. for 4 hours and to 90° C. for 4 hours, the bisphenol A still remained.

Example 8

To a 30 mL-test tube made of silicate glass and having a lid were charged 2.283 g (10.0 mmol) of bisphenol A, 2.360 g (11.0 mmol) of diphenyl carbonate, 0.033 g (0.12 mmol) of triisoamylamine, 0.16 mg (2.0 μmol) of sodium hydrogen carbonate, and 14.3 g of methylene chloride in a nitrogen atmosphere, followed by heating at 40° C. for 2 hours and at 50° C. for 2 hours while stirring. Since an insoluble matter was found, it was heated at 60° C. for 4 hours while stirring. The reaction solution was transferred to a 50 mL-eggplant flask and attached to an evaporator. The eggplant flask was heated in a warm water bath at 70° C., the pressure thereof was decreased from 200 mmHg to 40 mmHg, and the liquid was distilled away, thereby obtaining a liquid with high viscosity. The distillate contained methylene chloride.

When the liquid with high viscosity was heated in a vacuum drier under reduced pressure (0.133 kPa (absolute pressure)) at 100° C. for 2 hours, 120° C. for 2 hours, 140° C. for 3 hours, and 150° C. for 2 hours, a white plate-like solid was obtained. The mass average molecular weight of the obtained solid was 2,653. It was further heated in the vacuum drier under reduced pressure (0.133 kPa (absolute pressure)) at 170° C. for 2 hours. The mass average molecular weight of the obtained solid was 2,951.

The present invention has been described in detail with reference to the specific embodiments, but it is apparent to those skilled in the art that various changes or modifications can be added without departing from the sprit and the scope of the present invention.

The present application is based on Japanese Patent Application No. 2013-085816, filed on Apr. 16, 2013 and the contents thereof are incorporated herein by reference.

INDUSTRIAL APPLICABILITY

The polycarbonate obtained by the production method of the present invention is useful as optical members (lenses, optical fibers, films, backlight diffusion plates for an LCD, photoreceptors, etc.), DVD and CD discs, electronic component housings (mobile phones, etc.), windows of transport equipment, transparent roof materials, windshields, screens, bulletproof windows, tableware, suitcases, helmets, and the like.

The invention claimed is:

1. A method of producing polycarbonate comprising following step (a) and step (b):
    (a) a step of reacting at least one kind of fluorine-containing carbonate selected from the group consisting of a compound represented by Formula (1), a compound represented by Formula (2), a compound represented by Formula (3), and a compound represented by Formula (4), and an aromatic dihydroxy compound in the presence of a condensation catalyst, to obtain a prepolymer; and
    (b) a step of heating the prepolymer at a temperature which is lower than a melting temperature of the prepolymer and performing solid phase polymerization on the prepolymer while a fluorine-containing alcohol that is produced as a by-product is discharged out of a system, to obtain a polycarbonate:

[Chem. 1]

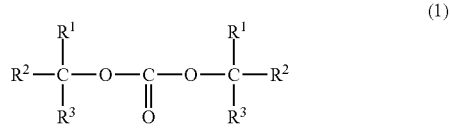

(1)

wherein, $R^1$ represents a group represented by $CA^1B^1R^4$'s and two $R^1$'s may be the same as or different from each other, $R^2$ represents a group represented by $CA^2B^2R^5$ and two $R^2$'s may be the same as or different from each other, $R^3$ represents a hydrogen atom or a group represented by $CA^3B^3R^6$ and two $R^3$'s may be the same as or different from each other, $A^1$ to $A^3$ each represents a hydrogen atom, a fluorine atom, or $R^f$, $B^1$ to $B^3$ each represents a hydrogen atom, a fluorine atom, or $R^f$, $R^4$ to $R^6$ represent a fluorine atom, $R^f$, or $OR^f$, and $R^f$ represents a fluoroalkyl group (which may contain an ethereal oxygen) having 1 to 12 carbon atoms or a fluoroaryl group (which may contain an ethereal oxygen) having 6 to 10 carbon atoms;

[Chem. 2]

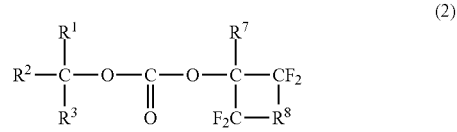

(2)

wherein, $R^1$ represents a group represented by $CA^1B^1R^4$,
$R^2$ represents a group represented by $CA^2B^2R^5$,
$R^3$ represents a hydrogen atom or a group represented by $CA^3B^3R^6$,
$R^7$ represents a hydrogen atom,
$R^8$ represents a perfluoroalkylene group (which may contain an ethereal oxygen) having 1 to 5 carbon atoms,
$A^1$ to $A^3$ each represents a hydrogen atom, a fluorine atom, or $R^f$,
$B^1$ to $B^3$ each represents a hydrogen atom, a fluorine atom, or $R^f$,
$R^4$ to $R^6$ represent a fluorine atom, $R^f$, or $OR^f$, and
$R^f$ represents a fluoroalkyl group (which may contain an ethereal oxygen) having 1 to 12 carbon atoms or a fluoroaryl group (which may contain an ethereal oxygen) having 6 to 10 carbon atoms;

[Chem. 3]

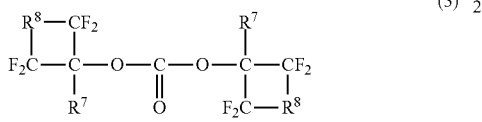

(3)

wherein, $R^7$ represents a hydrogen atom, and
$R^8$ represents a perfluoroalkylene group (which may contain an ethereal oxygen) having 1 to 5 carbon atoms and two $R^8$'s may be the same as or different from each other; and

[Chem. 4]

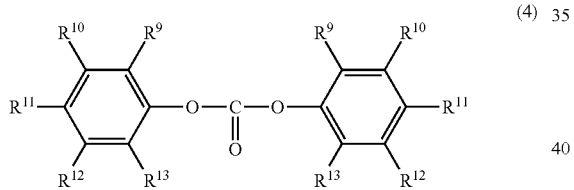

(4)

wherein, $R^9$ to $R^{13}$ each represents a hydrogen atom, a fluorine atom, or a fluoroalkyl group (which may contain an ethereal oxygen) having 1 to 6 carbon atoms, two $R^9$'s, two $R^{10}$'s, two $R^{11}$'s, two $R^{12}$'s, and two $R^{13}$'s may be respectively the same as or different from each other, and the molecule includes at least one fluorine atom.

2. The method of producing polycarbonate according to claim 1, wherein the molar ratio (fluorine-containing carbonate/aromatic dihydroxy compound) of the fluorine-containing carbonate to the aromatic dihydroxy compound in the step (a) is from 1/1 to 2/1.

3. The method of producing polycarbonate according to claim 1, wherein the prepolymer obtained in the step (a) has a mass average molecular weight of from 1,000 to 10,000.

4. The method of producing polycarbonate according to claim 1, wherein the prepolymer obtained in the step (a) has a glass transition temperature of from 60° C. to 120° C.

5. The method of producing polycarbonate according to claim 1, wherein the prepolymer in the step (b) is in a powder state.

6. The method of producing polycarbonate according to claim 1, wherein the condensation catalyst in the step (a) is a basic ester exchange catalyst.

7. The method of producing polycarbonate according to claim 1, wherein the heating temperature in the step (b) is 60° C. or higher.

8. The method of producing polycarbonate according to claim 1, wherein the fluorine-containing alcohol that is produced as a by-product is discharged out of the system in the step (b) at a reduced pressure of 13 kPa (absolute pressure) or less.

9. The method of producing polycarbonate according to claim 1, wherein the fluorine-containing carbonate is at least one selected from the group consisting of bis(1,1,1,3,3,3-hexafluoroisopropyl)carbonate, bis(perfluoro(t-butyl))carbonate, and bis(2,2,3,3,4,4,5,5,6,6-decafluorocyclohexyl)carbonate.

10. The method of producing polycarbonate according to claim 1, wherein the aromatic dihydroxy compound is 2,2-bis(4-hydroxyphenyl)propane.

11. The method of producing polycarbonate according to claim 1, wherein the fluorine-containing carbonate is produced by a reaction using at least one fluorine-containing alcohol selected from the group consisting of a compound represented by Formula (5) and a compound represented by Formula (6), as a starting material;

[Chem. 5]

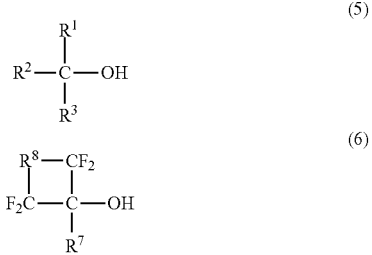

wherein, $R^1$ represents a group represented by $CA^1B^1R^4$,
$R^2$ represents a group represented by $CA^2B^2R^5$,
$R^3$ represents a hydrogen atom or a group represented by $CA^3B^3R^6$,
$R^7$ represents a hydrogen atom,
$R^8$ represents a perfluoroalkylene group (which may contain an ethereal oxygen) having 1 to 5 carbon atoms,
$A^1$ to $A^3$ each represents a hydrogen atom, a fluorine atom, or $R^f$,
$B^1$ to $B^3$ each represents a hydrogen atom, a fluorine atom, or $R^f$,
$R^4$ to $R^6$ each represents a fluorine atom, $R^f$, or $OR^f$, and
$R^f$ represents a fluoroalkyl group (which may contain an ethereal oxygen) having 1 to 12 carbon atoms or a fluoroaryl group (which may contain an ethereal oxygen) having 6 to 10 carbon atoms.

12. The method of producing polycarbonate according to claim 11, wherein the fluorine-containing alcohol has a pKa of 12 or less.

13. The method of producing polycarbonate according to claim 11, wherein the fluorine-containing alcohol is at least one selected from the group consisting of 1,1,1,3,3,3-hexafluoroisopropanol, perfluoro(t-butyl)alcohol, and 2,2,3,3,4,4,5,5,6,6-decafluorocyclohexanol.

14. A polycarbonate which is produced by the production method according to claim 1, and has a mass average molecular weight of from 20,000 to 200,000.

* * * * *